United States Patent [19]

Maehara et al.

[11] Patent Number: 4,984,164
[45] Date of Patent: Jan. 8, 1991

[54] ANTI-LOCK CONTROL METHOD AND APPARATUS FOR VEHICLES

[75] Inventors: Toshifumi Maehara; Satomi Okubo, both of Saitama, Japan

[73] Assignees: Akebono Brake Industry Co., Ltd., Tokyo; Akebono Research and Development Centre Ltd., Saitama, both of Japan

[21] Appl. No.: 403,375

[22] Filed: Sep. 6, 1989

[30] Foreign Application Priority Data

Sep. 8, 1988 [JP] Japan ................... 63-223591

[51] Int. Cl.$^5$ ............................................. B60T 8/58
[52] U.S. Cl. ............................... 364/426.02; 303/96; 303/103
[58] Field of Search ................ 364/426.02, 426.03, 364/565, 566; 180/197; 303/94–96, 103, 105, 109

[56] References Cited

U.S. PATENT DOCUMENTS

| | | | |
|---|---|---|---|
| 4,741,580 | 3/1988 | Matsubara et al. | 364/426.02 |
| 4,773,014 | 9/1988 | Hagiya et al. | 364/426.02 |
| 4,797,825 | 1/1989 | Shimanuki et al. | 364/426.02 |
| 4,807,133 | 2/1989 | Shimanuki et al. | 364/426.02 |
| 4,825,371 | 4/1989 | Hoashi et al. | 364/426.02 |
| 4,870,582 | 9/1989 | Hoashi et al. | 364/426.02 |

Primary Examiner—Gary Chin
Attorney, Agent, or Firm—Cushman, Darby & Cushman

[57] ABSTRACT

An anti-lock control apparatus for a vehicle, comprising, a sensor for sensing wheel speeds of the vehicle, a braking system for braking the vehicle wheels, and a controller for controlling the braking system, according to an output of the wheel speeds sensors. The controller set a vehicle speed, a first and second threshold speeds, whereby the first and second threshold speeds follow over time the vehicle speed with a constant prescribed speed difference so as to satisfy the relation $Vv > VT1 > VT2$, where Vv, VT1 and VT2 represent the vehicle speed, first and second threshold speeds, respectively.

5 Claims, 4 Drawing Sheets

ANTI-LOCK CONTROL METHOD AND APPARATUS FOR VEHICLES

FIELD OF THE INVENTION

The present invention relates to an anti-lock control method for preventing locking of wheels at the time of braking operation of the vehicle.

BACKGROUND OF THE INVENTION

In general, with an anti-lock control device for a vehicle, anti-lock control is effected by means of a microcomputer such that hold valves and decay valves are opened and closed on the basis of electrical signals representing wheel speeds detected by wheel speed sensors, thereby increasing, holding or decreasing the brake hydraulic pressure, for the purpose of securing improved steering performance and running stability, while at the same time reducing the braking distance of the vehicle.

FIG. 1 shows control state diagrams as disclosed in U.S. Pat. No. 4,741,580 which illustrate the changes in the wheel speed Vw, the wheel acceleration and deceleration Vw and the brake hydraulic pressure Pw, as well as a hold signal HS and a decay signal DS for opening and closing the hold valves and the decay valves.

In a state of the vehicle in running where no brake is operated, the brake hydraulic pressure Pw is not increased and both of the hold signal HS and the decay signal DS are in the off-state, so that the hold valve is in the open state whereas the decay valve is in the closed state. However, with a brake operation, the brake hydraulic pressure Pw increases rapidly from time point t0 (normal mode), reducing the wheel speed Vw. There is set up a reference wheel speed Vr which is lower by a predetermined amount $\Delta V$ than the wheel speed Vw and follows the latter with such a speed difference. The reference wheel speed Vr is set up so that when the wheel deceleration (negative acceleration) Vw of the wheel attains a predetermined threshold value, $-1G$, for instance, at a time point t1, it decreases linearly in time from the time point t1 with a slope $\theta$ for the deceleration of $-1G$.

At a time point t2 when the wheel declaration Vw reaches a predetermined value $-Gmax$ with maximum absolute value, the hold valve closes by turning on the hold signal HS to hold the brake hydraulic pressure Pw.

With the holding of the brake hydraulic pressure Pw in such a manner, the wheel speed Vw further decreases to become less than the reference wheel speed Vr beyond a time point t3. At that time point t3 the decay signal DS is turned on to open the decay valve to start reducing the brake hydraulic pressure Pw. As a result of the pressure reduction, the wheel speed Vw is shifted from decrease to increase at a time point t4 when a low peak Vl of the wheel speed Vw occurs. At the time point t4 of the low peak, the decay signal DS is turned off to close the decay valve, so that the reduction of the brake hydraulic pressure Pw is completed and the brake hydraulic pressure Pw is held at the value at that time.

Next, when the wheel speed Vw attains a high peak Vh at a time point t7, an increase in the brake hydraulic pressure takes place again. The pressure increase in the brake hydraulic pressure Pw and the decrease in the wheel speed Vw in this stage is arranged to take place gradually by a repetition of turning on and off of the hold signal HS mincingly. Starting at a time point t8 (corresponding to t3) a decompression mode is generated again.

It is to be noted that during the above operation, a time point t5 is detected at which the wheel speed Vw is recovered to a speed $Vb(=Vl+0.15Y)$ where Vl is the wheel speed at the low peak and Y is the difference between the wheel speed Va at the time point t3 and the low peak speed Vl, so that Vb represents the wheel speed at which 15% of the speed difference Y is gained from the low peak value Vl. Also, a time point t6 is detected at which the wheel speed increases to $Vc(=Vl+0.8Y)$ where 80% of the speed difference Y is gained from the low peak speed Vl. Further, the interval Tx of the first pressurization which starts at the time point t7 is determined by the judgment of the friction coefficient $\mu$ of the road surface as obtained based on the computation of the average acceleration $(Vc-Vb)/\Delta T$ for the period $\Delta T$ between the time points t5 and t6. In addition, the holding periods or the pressurization periods that follow are determined based on the vehicle deceleration Vw that are detected immediately before each holding or pressurization. Through a combination of augmentation, holding and reduction of the brake hydraulic pressure Pw as described in the above, it is possible to reduce the vehicle speed by controlling the wheel speed Vw without causing the locking of the wheels.

Now, as is clear from the above description, in the conventional anti-lock control method, the threshold value of deceleration at which the reference wheel speed Vr is to be changed to have a certain deceleration slope in order to increase the S/N rate in consideration of the road surface noise and the like, is selected at a value, $-1$ G, for example, which has a greater absolute value than that of the vehicle speed generated in the normal deceleration. Then, the reference wheel speed Vr is reduced starting with the time point t1 with the deceleration slope $\theta$ for $-1G$ based on the detection of the predetermined threshold value $-1G$ of deceleration of the wheel speed Vw, and the reduction of the brake hydraulic pressure Pw starts from the time point t3 at which the wheel speed Vw becomes equal to the reference wheel speed Vr. Because of this, if a gentle braking is performed such that the wheel speed Vw decreases with a deceleration Vw which will not attain the predetermined value of $-1G$, $-0.7$ G, for example, the reference speed Vr which merely follows the wheel speed Vw with a speed difference of $\Delta V$ will never come to cross the wheel speed Vw. Then, speed reduction will continue independent of the vehicle speed without detecting the pressure reduction point for the brake hydraulic pressure Pw. As a result, there was a possibility of generating a premature locking of the wheels in case when the vehicle runs on a road surface with a small value of friction coeficient $\mu$.

SUMMARY OF THE INVENTION

It is, therefore, an object of the present invention to provide an anti-lock control method for a vehicle which makes it possible to carry out an optimum control in response to all kinds of road surface conditions.

One of the features cf the present invention is that a variety of statuses are set by distinctly segmenting the conditions for each status in order to carry out anti-lock control.

In the present invention, when the wheel speed Vw which is decelerated by an increase in the brake hydraulic pressure attains a predetermined deceleration, there is set up a reference wheel speed Vr which decreases linearly in time with the predetermined deceleration from a speed (Vw−ΔV) that is lower than the wheel speed Vw by a predetermined amount ΔV. At the same time, there are set a first threshold speed VT1 and a second threshold speed VT2 which follow a computed vehicle speed Vv with predetermined speed differences so as to satisfy the relation Vv>VT1>VT2.

Further, the starting time of the decompression status is chosen to be the time whichever is the sooner between the time point at which the wheel speed Vw becomes equal to or lower than the reference wheel speed Vr and the time point at which the wheel speed Vw becomes equal to or lower than the first threshold speed VT1. The completion time of the decompression status is chosen to be the time whichever is the sooner between the time point at which the wheel speed Vw attains its low peak and the time point, when the wheel speed Vw had become equal to or lower than the second threshold speed VT2, at which the wheel speed Vw becomes equal to or lower than the second threshold speed VT2 again.

DESCRIPTION OF THE PREFERRED EMBODIMENTS

Figure 1:
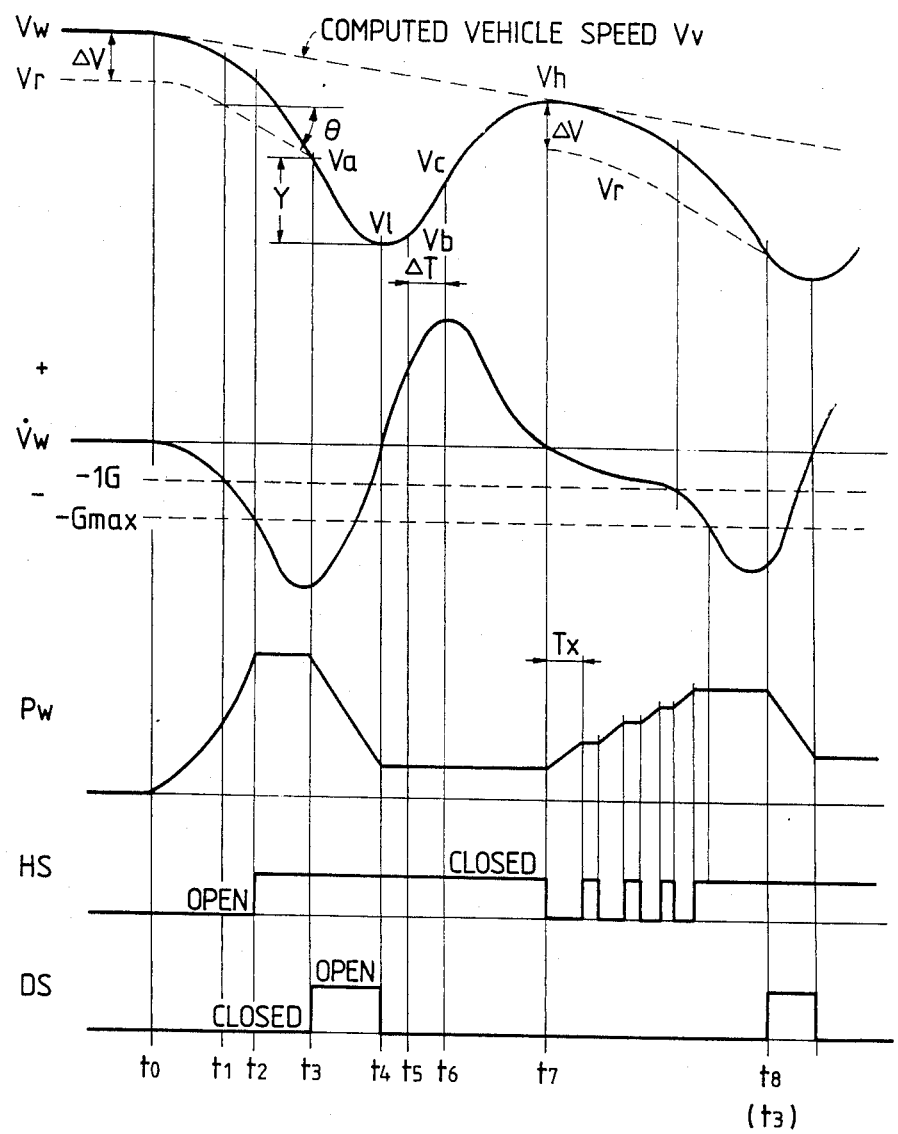
FIG. 1 is a timing chart for the conventional anti-lock control method.

Referring to the drawings, an embodiment of the present invention will now be described in detail below.

Figure 2:
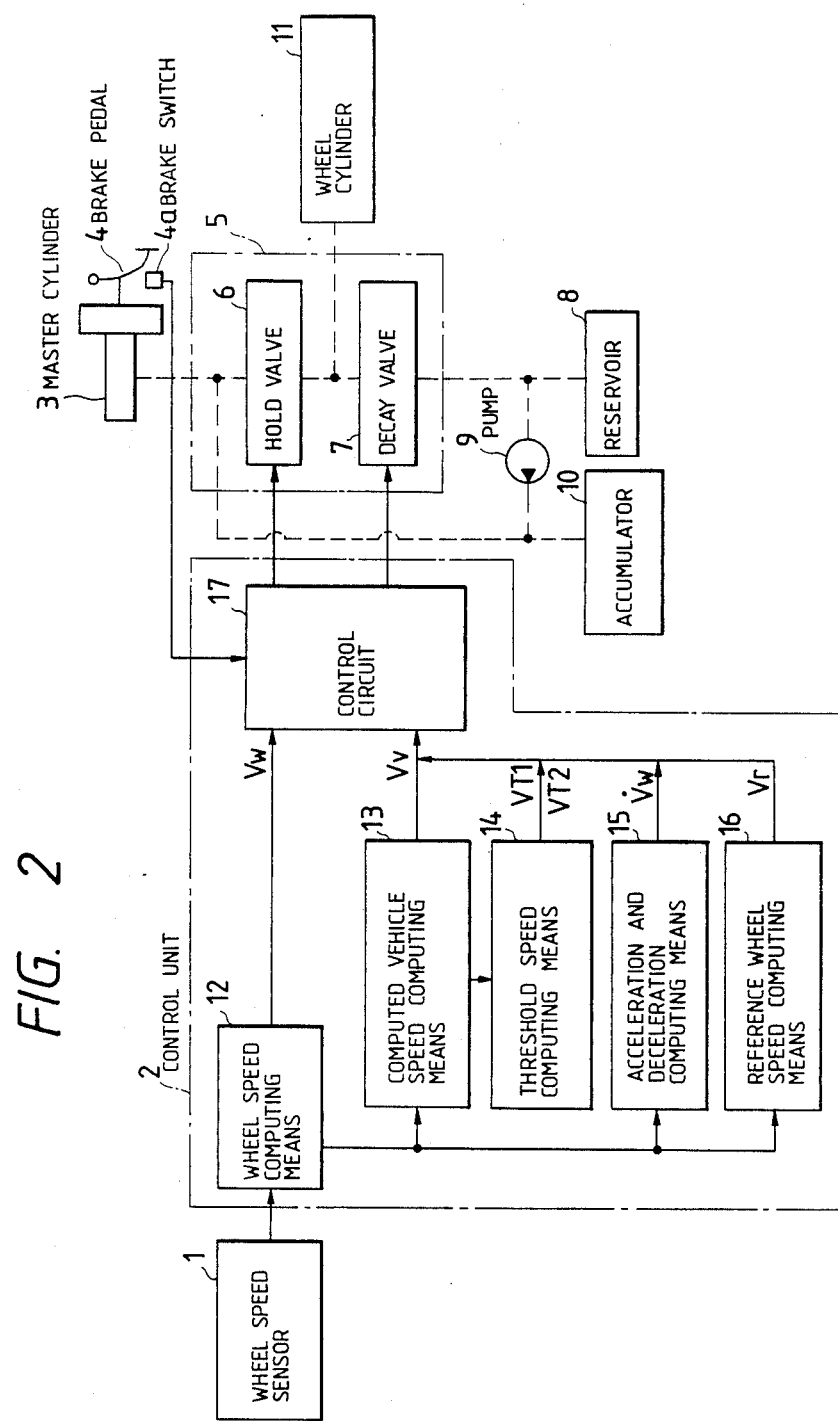
FIG. 2 is a block diagram for the control system as applied to an embodiment of anti-lock control in accordance with the present invention.

FIG. 2 is a block diagram for the control system according to the embodiment of the present invention. In the system shown in FIG. 2, a wheel speed sensor 1 is provided for each of the four wheels, a control unit 2 consists of a computer, a master cylinder 3 is operated by a brake pedal 4, a modulator 5 includs a hold valve 6 which is a normally-open type solenoid valve and a decay valve 7 which is a normally-closed solenoid valve, a reservoir 8 reserves brake fluid which is pumped up to be stored in an accumulator 10. Further, the system comprises a brake switch 4a which is closed by stepping on the brake pedal 4, and a wheel cylinder 11 of the brake device for the wheel.

The control unit 2 includes wheel speed computing means 12 for computing the wheel speed Vw from the output of each wheel speed sensor, computed (pseudo) vehicle speed computing means 13 which selects the highest wheel speed (select-high) out of the four wheel speeds Vw, and obtain a computed vehicle speed Vv through filters with acceleration and deceleration ±1G, and threshold value computing means 14 for computing a first threshold speed VT1 and a second threshold speed VT2 that follow the computed vehicle speed with respective predetermined speed (Vv>VT1>VT2). Moreover, the control unit 2 includes acceleration and deceleration computing means 15 for computing the acceleration and deceleration Vw of the wheel speed Vw, and reference wheel speed computing means 16 for computing a reference wheel speed Vr which decreases from a speed obtained by subtracting a predetermined amount ΔV from the wheel speed Vw, with the deceleration for −1G. The control unit 2 also includes a control circuit 17 which executes augmentation, holding and reduction of the brake hydraulic pressure within the cylinder 11 by controlling the opening and closing of the hold valve 5 and the decay valve 6 based on the outputs from the respective means 12 to 16.

Figure 3:
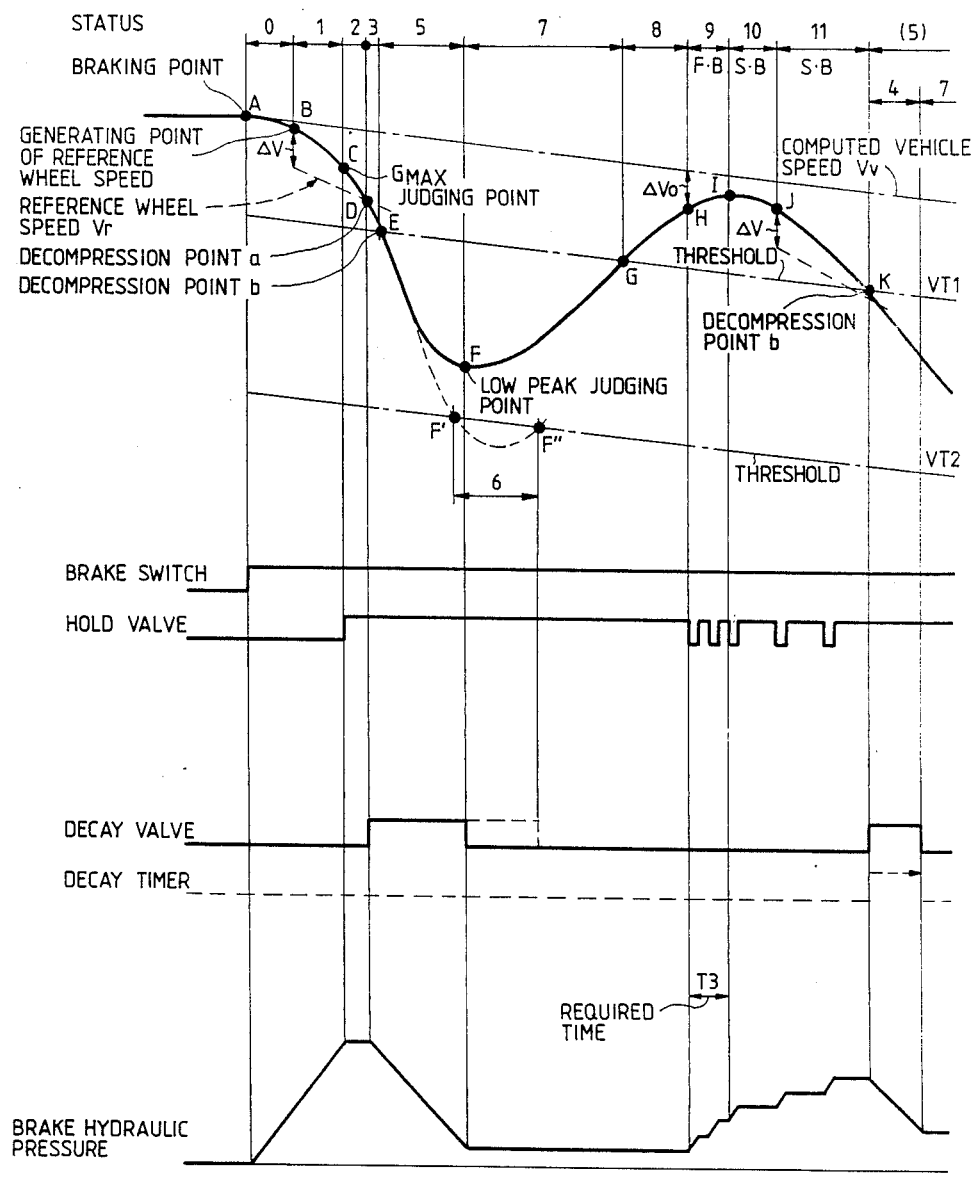
FIG. 3 is a timing chart for the control.
Figure 4:
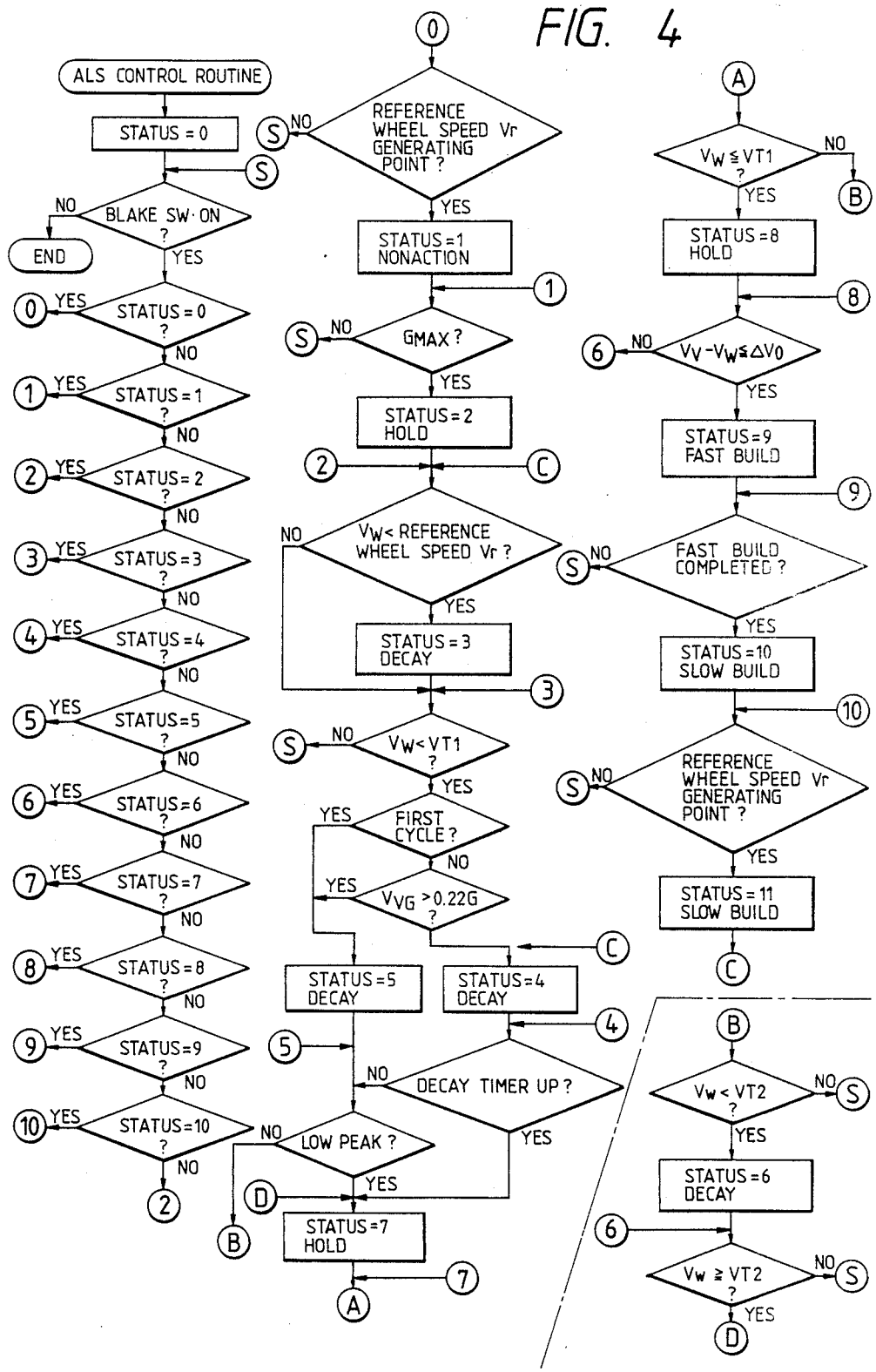
FIG. 4 is a flow chart.

Next, referring to FIG. 3 showing the timing chart for control in each of the status and FIG. 4 showing the control flowchart, an example of the anti-lock control in accordance with the present invention will be illustrated. Here, it should be noted that the control of the brake hydraulic pressure in the present invention will be carried out in the case, for example, of a vehicle equipped with a dual circuit brake system of X-piping type, the left-front wheel and the right-rear wheel are grouped to form one system and the right-front wheel and the left-rear wheel are grouped to form another system, and the wheel speed on the low speed side in each system is considered to represent the wheel speed of control object (system speed), with the modulation 5 belonging to each system being controlled.

STATUS 0

This status is defined as the interval from a time point A at which the brake switch 4a is closed by the stepping on the brake pedal to a time point at which there is generated a reference wheel speed Vr which decreases linearly through attaining by the deceleration Vw of the wheel speed a predetermined deceleration value (−1G, for example). The hold valve is in an open state while the decay valve is in the closed state, so that the brake hydraulic pressure within the wheel cylinder 11 will rise by the brake fluid supplied from the master cylinder 3.

STATUS 1

This status is defined to cover from the time point B of the reference wheel speed Vr to a time point C at which it is judged that the deceleration Vw of the wheel speed attained a predetermined deceleration Gmax. In this status the hold valve 6 and the decay valve 7 are inoperative.

STATUS 2

Holding

This status is defined to cover from the judging time point C of Gmax to the time point whichever may be the sooner between the time point at which the wheel speed Vw becomes equal to or lower than the reference wheel speed Vr (decompression point a) and the time point at which the wheel speed Vw becomes equal to or lower than the first threshold speed VT1 (decompression point b). The hold valve 6 closes at the time point C, and the brake hydraulic pressure is held during the status. It is to be noted that in FIG. 3 the status 2 terminates at the time point D when the wheel speed Vw is about to be overtaken by the reference wheel speed Vr. However, if the wheel speed Vw is to be overtaken by the first threshold speed VT1 prior to the time point D, the status 2 will be terminated at that time point.

STATUS 3

Decompression

This status is defined to cover from the time point D at which the wheel speed Vw becomes equal to or lower than the reference wheel speed Vr to a time point E at which the wheel speed Vw becomes equal to or lower than the first threshold speed VT1. The decay valve 7 opens at the time point D, and a decompression of the brake hydraulic pressure will be started.

STATUS 4

Decompression

This status occur when the control cycle is in a second or later cycle and the absolute value of the deceleration Vv of the computed vehicle speed Vv is lower than −0.22G. The Status 4 is defined to last from the time at which the wheel speed Vw becomes equal to or lower than the first threshold speed VT1 to the time one of the following conditions is fulfilled.

(1)When a decay timer which was set at the start of the decompression counts up its time in order to prevent an excessive decompression.

(2) When the wheel speed Vw becomes equal to or lower than the second threshold speed VT2.

(3) When the wheel speed Vw is judged to have attained a low peak.

STATUS 5

Decompression

This status occurs when the control cycle is in a first cycle or when the absolute value of the deceleration Vv of the computed vehicle speed Vv is greater than −0.22G. It is defined to cover the period from a time point E at which the wheel speed Vw is about to be overtaken by the first threshold speed VT1 to the sooner of a time point F at which the wheel speed Vw is judged to have attained a low peak and a time point F' at which the wheel speed Vw becomes equal to or lower than the second threshold speed VT2.

STATUS 6

Decompression

This status is defined during the period when the wheel speed Vw is lower than the second threshold speed VT2, namely, from the time point F' to the time point F" in the figure.

STATUS 7

Holding

The condition for the start of this Status 7 is considered to satisfy one of the following.

(1) When the occurrence of a low peak is judged in the Status 4 or 5.

(2) When the decay timer in the Status 4 counts up its time.

(3) When the wheel speed Vw becomes higher than the second threshold speed VT2 in the Status 6 (time point F").

The Status 7 is defined to cover the period from a time point at which one of the above condition is satisfied to a time point G at which the wheel speed Vw becomes equal to or higher than the first threshold speed VT1.

It is to be noted that if in the condition of the Status 7 the wheel speed Vw fails to overtake the first threshold speed VT1 after elapse of a predetermined time T1, it goes to Status 4 to carry out a decompression all over again.

STATUS 8

Holding

This status is defined to cover the period from a time point G at which the wheel speed Vw becomes higher than the first threshold speed VT1 to a time point H at which the wheel speed Vw attains the speed (Vv−ΔV0) which is lower than the computed speed Vv by a predetermined value ΔV0.

It should be noted that when in Status 8 the wheel speed Vw fails to overtake the speed (Vv−ΔV0) after elapse of a predetermined time T2, it goes to Status 11 to be set to a slow building (described later).

STATUS 9

Fast Building

This status is defined to cover the period from a time point H at which the wheel speed Vw becomes greater than the speed (Vv−ΔV0) to a time point I which corresponds to elapse of a predetermined time T3 after the time point H. During this status, the brake hydraulic pressure increases relatively rapidly by opening and closing the hold valve 6 mincingly.

STATUS 10

Slow Building

This status is defined to cover the period from a time point I at which the fast building ends to a time period J at which the reference wheel speed Vr is generated. During the Status 10, the brake hydraulic pressure increases gradually by opening and closing the hold valve 6 using longer closing times.

STATUS 11

Slow Building

This status is defined to cover the period from the time point J at which the reference wheel speed Vr is generated to the time point whichever is the sooner between a time point at which the wheel speed Vw becomes equal to or lower than the reference wheel speed Vr and time point at which the wheel speed Vw becomes equal to or lower than the first threshold speed VT1. In other words, although the situation is shown in FIG. 3 in which the Status 11 terminates at a time point K at which the wheel speed Vw is about to be overtaken by the first threshold speed VT1, if the wheel speed Vw is to be overtaken prior to the time point K, then the Status 11 will terminate at that time point. When the Status 11 terminates, it goes to the Status 4 or 5.

According to the status of the present invention, control of the wheel speed is carried out by setting numerous statuses and segmenting the conditions distinctly for each status, so that it is possible to execute an optimum anti-lock control for all circumstances conceivable.

Moreover, a first threshold speed VT1 and a second threshold speed VT2 that are based on a computed vehicle speed Vv are set along with the setting of a reference wheel speed Vr that determined the time point at which a decompression of the brake hydraulic pressure is started. Therefore, even when the deceleration of the wheel speed Vw is carried out gradually, the decompression is arranged to take place as soon as the wheel speed Vw becomes equal to or lower than the first threshold speed VT1, so that it is possible to obtain always a stabilized starting point of decompression. When the wheel speed Vw is decreased rapidly, the time point at which the wheel speed Vw becomes equal to or lower than the reference wheel speed Vr is set as the time at which depression is to be started, so that it is possible to start decompression without delay.

Further, since the decompression region is defined to begin when the wheel speed Vw becomes equal to or lower than the second threshold speed VT2, even when the friction coefficient $\mu$ of the road surface a sudden change from a high to a low value $\mu$ there can be obtained a sufficiently long decompression time after switching to the low $\mu$ value. Therefore, it is possible to prevent efficiently the locking of the wheels.

What is claimed is:

1. In an anti-lock control method for preventing locking of vehicle wheels when braking by a repetition of an increase and a decrease of brake hydraulic pressure in a motion responding to an electrical signal, the improvement comprising the steps of:
   setting a computed vehicle speed Vv based on a largest wheel speed Vw among wheel speeds for all the wheels at the time of braking;
   setting a first threshold speed VT1 and a second threshold speed VT2 that correspond over time to said computed vehicle speed Vv with a predetermined speed difference that is constant over said time so as to satisfy a relation Vv>VT1>VT2;
   setting a reference wheel speed Vr, when said wheel speed Vw attained a predetermined deceleration in response to an increase in said brake hydraulic pressure, which decreases linearly in time with said deceleration from an initial reference wheel speed (Vw−$\Delta$V) which is lower than said wheel speed Vw by an predetermined amount $\Delta$V; and
   decreasing said brake hydraulic pressure by establishing a decompression status period which begins from a first time point whichever happens sooner between a time at which said wheel speed Vw becomes lower than said reference wheel speed Vr and a time point at which said wheel speed Vw becomes lower than said first threshold speed VT1, said decompression status period ending at a second time point whichever happens sooner between a first possible time point at which said wheel speed Vw attains a low peak and a second possible time point, said second possible time point being defined whereby after said wheel speed Vw has dropped to below said second threshold speed VT2, said wheel speed Vw becomes higher than said second threshold speed VT2.

2. An anti-lock control apparatus for a vehicle, comprising:
   means for sensing respective wheel speeds of wheels of the vehicle;
   means for braking the vehicle wheels;
   means for controlling said braking means according to an output of said sensing means, said control means setting a vehicle speed and first and second threshold speeds, said first and second threshold speeds corresponding over time to said vehicle speed with a prescribed speed difference that is constant over said time so as to satisfy a relation Vv>VT1>VT2, where Vv, VT1 and VT2 represent said vehicle speed, said first and second threshold speeds, respectively; and
   means for setting a reference wheel speed, said reference wheel speed decreasing linearly in time with a predetermined deceleration from an initial reference wheel speed (Vw−$\Delta$V) which is lower than said wheel Vw speed by a predetermined value $\Delta$V when said wheel speed attains said predetermined deceleration in response to said vehicle wheel braking means,
   wherein said control means controls said braking means to decrease the brake hydraulic pressure during a period which begins from a first time point whichever happens sooner between a time at which said wheel speed becomes equal to or lower than said reference wheel speed at a time point at which said wheel speed becomes equal to or lower than said first threshold speed, said period ending at a second time point whichever happens sooner between a first possible time point at which said wheel speed attains a low peak and a second possible time point, said second possible time point being defined whereby after said wheel speed has dropped to below said second threshold speed, said wheel speed becomes higher than said second threshold speed.

3. The anti-lock control apparatus according to claim 2, wherein said vehicle speed set by said control means is the highest wheel speed among the actual wheel speeds for all wheels at the time of braking.

4. The anti-lock control apparatus according to claim 2, wherein said braking means comprises:
   a brake pedal;
   a hold valve of a normally-open type, said hold valve being actuated by a first solenoid;
   a decay valve of a normally-closed type, said decay valve being actuated by a second solenoid;
   a wheel cylinder provided at each of the vehicle wheels;
   a master cylinder for selectively supplying a hydraulic pressure to said wheel cylinder in accordance with an open-and-close operation of said hold valve and with a braking action of said brake pedal;
   an accumulator connected to said master cylinder;
   a reservoir supplied with a brake fluid in accordance with an open-and-close operation of said decay valve; and
   a pumping device for supplying the brake fluid in said reservoir to said accumulator.

5. In a two system X-piping type brake control device of a vehicle, an anti-lock control apparatus comprising;
   means for sensing wheel speeds of wheels of the vehicle;
   means for braking the vehicle wheels;
   means for controlling said braking means according to an output of said sensing means, said control means setting a vehicle speed and first and second threshold speeds, said first and second threshold speeds corresponding over time to said vehicle speed with a prescribed speed difference that is constant over said time so as to satisfy a relation Vv>VT1>VT2, where Vv, VT1 and VT2 represent said vehicle speed, said first and second threshold speeds, respectively; and
   means for setting a reference wheel speed, said reference wheel speed decreasing linearly in time with a predetermined deceleration from an initial reference wheel speed (Vw−$\Delta$V) which is lower that said wheel Vw speed by a predetermined value $\Delta$V when said wheel speed attains said predetermined deceleration in response to said vehicle wheel braking means,
   wherein said control means controls said braking means to decrease the brake hydraulic pressure during a period which begins from a first time point whichever happens sooner between a time at which said wheel speed becomes equal to or lower than said reference wheel speed and a time point at which said wheel speed becomes equal to or lower than said first threshold speed, said period ending at a second time point whichever happens sooner between a first possible time point at which said wheel speed attains a low peak and a second possible time point, said second possible time point being defined whereby after said wheel speed has dropped to below said second threshold speed said wheel speed becomes higher than said second threshold speed.

* * * * *